(12) United States Patent
Place et al.

(10) Patent No.: US 11,913,353 B2
(45) Date of Patent: Feb. 27, 2024

(54) AIRFOIL TIP ARRANGEMENT FOR GAS TURBINE ENGINE

(71) Applicant: RAYTHEON TECHNOLOGIES CORPORATION, Farmington, CT (US)

(72) Inventors: Emma J. Place, New Hartford, CT (US); Dominic J. Mongillo, West Hartford, CT (US); Jeremy B. Fredette, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/881,803

(22) Filed: Aug. 5, 2022

(65) Prior Publication Data

US 2023/0045259 A1  Feb. 9, 2023

Related U.S. Application Data

(60) Provisional application No. 63/230,399, filed on Aug. 6, 2021.

(51) Int. Cl.
*F01D 5/18* (2006.01)
*F01D 5/14* (2006.01)

(52) U.S. Cl.
CPC ............ *F01D 5/186* (2013.01); *F01D 5/141* (2013.01); *F05D 2220/323* (2013.01); *F05D 2240/30* (2013.01); *F05D 2260/202* (2013.01)

(58) Field of Classification Search
CPC . F01D 5/186; F01D 5/141; F01D 5/20; F05D 2260/202; F05D 2240/30
See application file for complete search history.

(56) References Cited

U.S. PATENT DOCUMENTS 5,176,499 A   1/1993   Damlis et al.
5,464,479 A   11/1995   Kenton et al.
(Continued)

FOREIGN PATENT DOCUMENTS

EP   1443178   8/2004
EP   1911934   4/2008
(Continued)

OTHER PUBLICATIONS

Patrial European Search Report for European Patent Application No. 22189324.1 dated Dec. 9, 2022.
(Continued)

*Primary Examiner* — Eldon T Brockman
(74) *Attorney, Agent, or Firm* — Carlson, Gaskey & Olds, P.C.

(57) ABSTRACT

An airfoil for a gas turbine engine according to an example of the present disclosure includes a platform section and an airfoil section extending in a spanwise direction from the platform section to a tip portion establishing a tip. The airfoil section has an external wall defining pressure and suction sides extending in a chordwise direction between a leading edge and a trailing edge, and the pressure and suction sides are spaced apart in a thickness direction between the leading edge and the trailing edge. The tip portion includes a tip pocket and a tip shelf extending inwardly from the tip. The tip pocket and tip shelf are on opposite sides of a shelf wall.

21 Claims, 10 Drawing Sheets

(56) References Cited

U.S. PATENT DOCUMENTS

| | | | |
|---|---|---|---|
| 6,824,359 | B2 | 11/2004 | Chlus et al. |
| 6,923,623 | B2 | 8/2005 | Cleveland et al. |
| 6,974,308 | B2 | 12/2005 | Halfmann et al. |
| 7,300,250 | B2 | 11/2007 | Papple |
| 7,377,746 | B2 | 5/2008 | Brassfield et al. |
| 7,413,403 | B2 | 8/2008 | Cunha et al. |
| 7,597,539 | B1 | 10/2009 | Liang |
| 7,625,178 | B2 | 12/2009 | Morris et al. |
| 7,857,587 | B2 | 12/2010 | Correia et al. |
| 7,972,115 | B2 * | 7/2011 | Potier ................. F01D 5/20 416/235 |
| 8,011,889 | B1 | 9/2011 | Liang |
| 8,092,179 | B2 | 1/2012 | Paauwe et al. |
| 9,470,096 | B2 * | 10/2016 | Mishra ............... F01D 5/186 |
| 9,605,545 | B2 | 3/2017 | Grohens et al. |
| 9,890,644 | B2 | 2/2018 | Tran et al. |
| 10,563,521 | B2 | 2/2020 | Clum et al. |
| 10,711,618 | B2 | 7/2020 | Mongillo et al. |
| 10,766,065 | B2 | 9/2020 | Tallman |
| 10,947,851 | B2 | 3/2021 | Evans |
| 11,143,035 | B2 * | 10/2021 | Place ................. F01D 5/187 |
| 11,203,058 | B2 * | 12/2021 | Castle ................. F01D 5/18 |
| 2004/0151586 | A1 | 8/2004 | Chlus et al. |
| 2005/0129516 | A1 | 6/2005 | Rinck et al. |
| 2007/0128033 | A1 | 6/2007 | Lee et al. |
| 2007/0258815 | A1 | 11/2007 | Liang |
| 2008/0056908 | A1 | 3/2008 | Morris et al. |
| 2008/0175716 | A1 * | 7/2008 | Potier ................. F01D 11/10 416/97 R |
| 2010/0023294 | A1 | 1/2010 | Fan et al. |
| 2011/0076405 | A1 | 3/2011 | Raji et al. |
| 2014/0030102 | A1 * | 1/2014 | Mishra ................ F01D 5/20 416/223 R |
| 2017/0183969 | A1 | 6/2017 | Dujol et al. |
| 2018/0050386 | A1 | 2/2018 | Talman |
| 2018/0156042 | A1 | 6/2018 | Mongillo, Jr. et al. |
| 2018/0156043 | A1 | 6/2018 | Clum et al. |
| 2018/0156045 | A1 | 6/2018 | Clum et al. |
| 2018/0306035 | A1 | 10/2018 | Eneau |
| 2020/0102841 | A1 | 4/2020 | Peters et al. |
| 2021/0115799 | A1 * | 4/2021 | Place ................. B22D 25/02 |
| 2021/0154729 | A1 * | 5/2021 | Castle ................. F01D 5/18 |
| 2022/0025769 | A1 * | 1/2022 | Place ................. B22C 23/00 |

FOREIGN PATENT DOCUMENTS

| | | |
|---|---|---|
| EP | 2851511 | 3/2015 |
| EP | 3330487 | 6/2018 |
| EP | 3406852 | 11/2018 |
| EP | 3808941 | 4/2021 |
| EP | 3825031 | 5/2021 |
| FR | 3072415 | 4/2019 |
| WO | 20150181488 | 12/2015 |

OTHER PUBLICATIONS

European Search Report for European Patent Application No. 19200847.2 dated Feb. 19, 2020.
International Search Report and Written Opinion for International application No. PCT/US2014/047991 dated Nov. 20, 2014.
International Preliminary Report on Patentability for International Application No. PCT/US2014/047991 dated Feb. 18, 2016.
Supplementary European Search Report for European Patent Application No. 14834675.2 dated Mar. 27, 2017.
European Search Report for European Patent Application No. 22189324.1 dated Mar. 14, 2023.

* cited by examiner

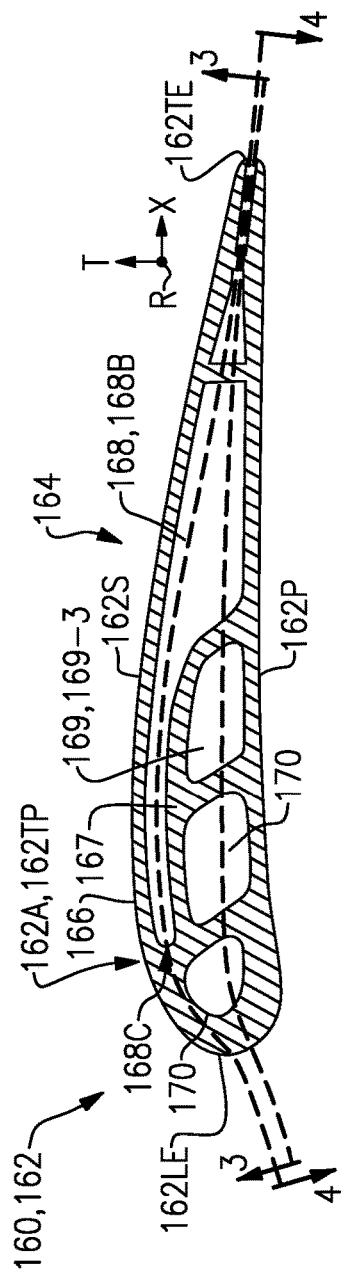
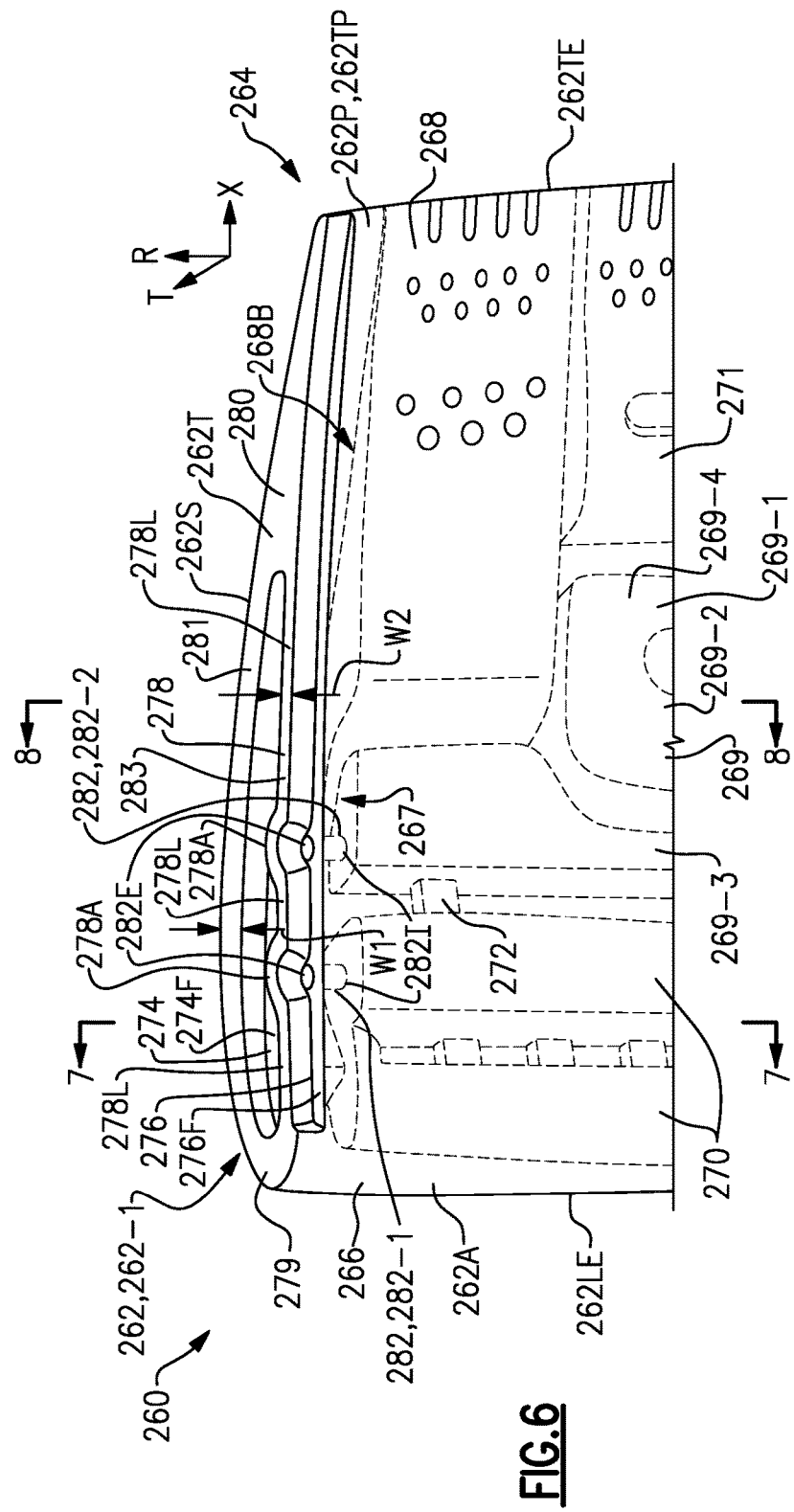

AIRFOIL TIP ARRANGEMENT FOR GAS TURBINE ENGINE

CROSS-REFERENCE TO RELATED APPLICATION

The present disclosure claims the benefit of U.S. Provisional Patent Application No. 63/230,399, filed Aug. 6, 2021.

BACKGROUND

This disclosure relates to cooling schemes for a component, such as a component of a gas turbine engine.

Gas turbine engines may include a fan for propulsion air. The fan may also deliver air into a core engine where it is compressed. The compressed air is then delivered into a combustion section, where it is mixed with fuel and ignited. The combustion gas expands downstream over and drives turbine blades. Static vanes may be positioned adjacent to the turbine blades to control the flow of the products of combustion.

Due to exposure to hot combustion gases, numerous components of a gas turbine engine, such as turbine blades and vanes, may include cooling schemes that circulate airflow to cool the component during engine operation. Thermal energy is transferred from the component to the airflow as the airflow circulates through the cooling scheme to cool the component. The blade may include a tip pocket that receives airflow to cool the tip and establish a sealing relationship with an adjacent blade outer air seal.

SUMMARY

An airfoil for a gas turbine engine according to an example of the present disclosure includes a platform section and an airfoil section extending in a spanwise direction from the platform section to a tip portion establishing a tip. The airfoil section has an external wall defining pressure and suction sides extending in a chordwise direction between a leading edge and a trailing edge, and the pressure and suction sides are spaced apart in a thickness direction between the leading edge and the trailing edge. The tip portion includes a tip pocket and a tip shelf extending inwardly from the tip. The tip pocket and tip shelf are on opposite sides of a shelf wall, and the shelf wall has a serpentine profile.

In a further embodiment of any of the foregoing embodiments, the tip pocket is bounded in the thickness direction between the shelf wall and a sidewall. The tip pocket extends in the spanwise direction from a pocket floor to the tip, and a radial face of the sidewall slopes outwardly from a first position to a second position at the tip. The first position corresponds to a span position of the pocket floor relative to the spanwise direction. A bow angle is established between the first position and the second position relative to an axis extending in the spanwise direction, and the bow angle is greater than or equal to 10 degrees.

In a further embodiment of any of the foregoing embodiments, the sidewall extends along the pressure side of the airfoil section.

In a further embodiment of any of the foregoing embodiments, the bow angle is less than or equal to 45 degrees.

In a further embodiment of any of the foregoing embodiments, the tip portion includes at least one cooling passage extending between an inlet port and an exit port. The inlet port is coupled to an internal cavity established in the airfoil section. The exit port is established along a shelf floor of the tip shelf. The shelf wall includes an arcuate section dimensioned to follow a perimeter of the exit port to establish the serpentine profile.

In a further embodiment of any of the foregoing embodiments, the shelf wall extends in the chordwise direction from a leading edge lip to a trailing edge lip that cooperate to bound the tip pocket. A width of the shelf wall at the tip varies no more than 10 percent between the leading and trailing edge lips.

In a further embodiment of any of the foregoing embodiments, the tip portion includes a plurality of cooling passages having respective exit ports distributed along the shelf floor of the tip shelf. Each of the exit ports has a trenched section extending from the shelf floor along a radial face of the shelf wall to the tip.

In a further embodiment of any of the foregoing embodiments, the tip pocket extends in the spanwise direction from a pocket floor to the tip. The tip portion extends in the thickness direction between the pressure and suction sides to establish a width. The width is measured at an innermost span position of the pocket floor relative to the spanwise direction. The airfoil section extends in the spanwise direction from the platform section to the tip to establish a height, and a ratio of the width to the height is equal to or greater than 0.1.

In a further embodiment of any of the foregoing embodiments, the platform section is established between the airfoil section and a root section. The root section is dimensioned to mount the airfoil to a rotatable hub. The airfoil section includes an internal wall extending inwardly from the tip portion with respect to the spanwise direction, and the airfoil section establishes an internal cooling arrangement including a flag cooling passage that has a first section and a tip flag section. The first section extends in the spanwise direction from the root section, and the tip flag section extends in the chordwise direction along the tip portion from the first section to the trailing edge. A serpentine cooling passage has a plurality of sections interconnected by one or more bends. The tip flag section and the serpentine cooling passage are situated on opposite sides of the internal wall relative to the thickness direction at a position aligned with the tip pocket relative to the chordwise direction.

In a further embodiment of any of the foregoing embodiments, the tip flag section is established between the internal wall and the suction side, and the serpentine cooling passage is established between the internal wall and the pressure side.

In a further embodiment of any of the foregoing embodiments, the tip portion includes at least one cooling passage extending between an inlet port and an exit port. The inlet port is established along the serpentine cooling passage. The exit port is established along a shelf floor of the tip shelf, and the shelf wall has an arcuate section dimensioned to follow a perimeter of the exit port to establish the serpentine profile. The tip portion includes a plurality of cooling passages having respective inlet ports established along the tip flag section and having respective exit ports distributed in a row along the shelf floor of the tip shelf. Each of the exit ports has a trenched section extending from the shelf floor along a radial face of the shelf wall to the tip.

In a further embodiment of any of the foregoing embodiments, the trenched section establishes a first width at the shelf floor and a second width at the tip, and the second width is greater than the first width to establish a diffuser.

In a further embodiment of any of the foregoing embodiments, the airfoil is a turbine blade.

A gas turbine engine according to an example of the present disclosure includes a compressor section including a compressor, and a turbine section including a turbine coupled to the compressor. The turbine section includes an array of blades rotatable about a longitudinal axis and an array of vanes adjacent to the array of blades. Each blade of the array of blades includes an airfoil section extending in a radial direction from a root section to a tip portion establishing a tip. The airfoil section includes an external wall defining pressure and suction sides extending in a chordwise direction between a leading edge and a trailing edge, and the pressure and suction sides spaced apart in a thickness direction between the leading edge and the trailing edge. A platform section is between the root section and the tip portion relative to the radial direction. A tip pocket and a tip shelf extend inwardly from the tip, and the tip pocket and tip shelf are established on opposite sides of a shelf wall. The tip pocket is bounded in the thickness direction between the shelf wall and a sidewall. The tip pocket extends in the radial direction from a pocket floor to the tip. A radial face of the sidewall slopes outwardly from a first position to a second position at the tip. The first position corresponds to a span position of the pocket floor relative to a radial axis extending in the radial direction, and an average of a slope of the radial face between the first and second positions is greater than or equal to 10 degrees.

In a further embodiment of any of the foregoing embodiments, the shelf wall includes a serpentine profile.

In a further embodiment of any of the foregoing embodiments, the tip section includes a plurality of cooling passages having respective exit ports along a shelf floor of the tip shelf, and the shelf wall includes a plurality of undulations dimensioned to follow a perimeter of the respective exit ports to establish the serpentine profile.

In a further embodiment of any of the foregoing embodiments, the tip portion includes a plurality of cooling passages having respective exit ports distributed along the shelf floor of the tip shelf. Each of the exit ports of has a trenched section extending from the shelf floor along a radial face of the shelf wall to the tip. The trenched section of one or more of the cooling passages are established between the undulations.

In a further embodiment of any of the foregoing embodiments, the average of the slope is less than or equal to 30 degrees with respect to the radial axis. The tip pocket extends in the radial direction from a pocket floor to the tip. The tip flag extends in the thickness direction between the pressure and suction sides to establish a width. The width measured at an innermost position of the pocket floor relative to the radial direction. The airfoil section extends in the radial direction from the platform section to the tip to establish a height, and a ratio of the width to the height is equal to or greater than 0.1.

In a further embodiment of any of the foregoing embodiments, the platform section is established between the airfoil section and a root section, the root section is dimensioned to mount the blade to a rotatable hub, and the airfoil section establishes an internal cooling arrangement including a flag cooling passage that has a first section and a tip flag section. The first section extends in the radial direction from the root section, and the tip flag section extends in the chordwise direction along the tip portion from the first section to the trailing edge. A serpentine cooling passage includes a plurality of sections interconnected by one or more bends. The tip flag section and the serpentine cooling passage are situated on opposite sides of the internal wall relative to the thickness direction at a position aligned with the tip pocket relative to the chordwise direction.

In a further embodiment of any of the foregoing embodiments, the tip flag section is at least partially aligned with the tip pocket relative to the thickness direction.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 5 is a sectional view taken along line 5-5 of the component of FIG. 4.

FIG. 6 illustrates another exemplary gas turbine engine component including a tip arrangement.

Like reference numbers and designations in the various drawings indicate like elements.

DETAILED DESCRIPTION

Figure 1:
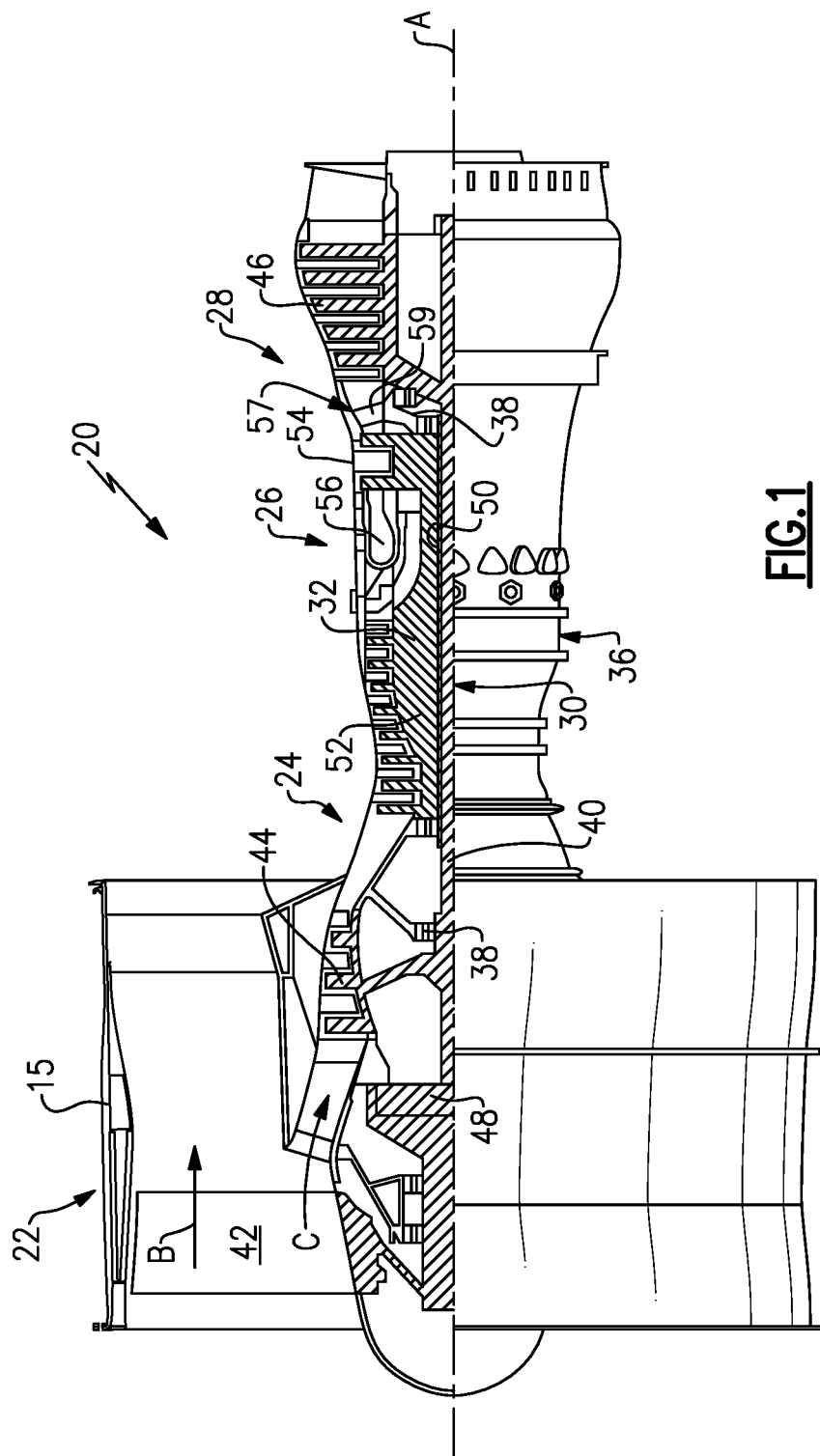
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
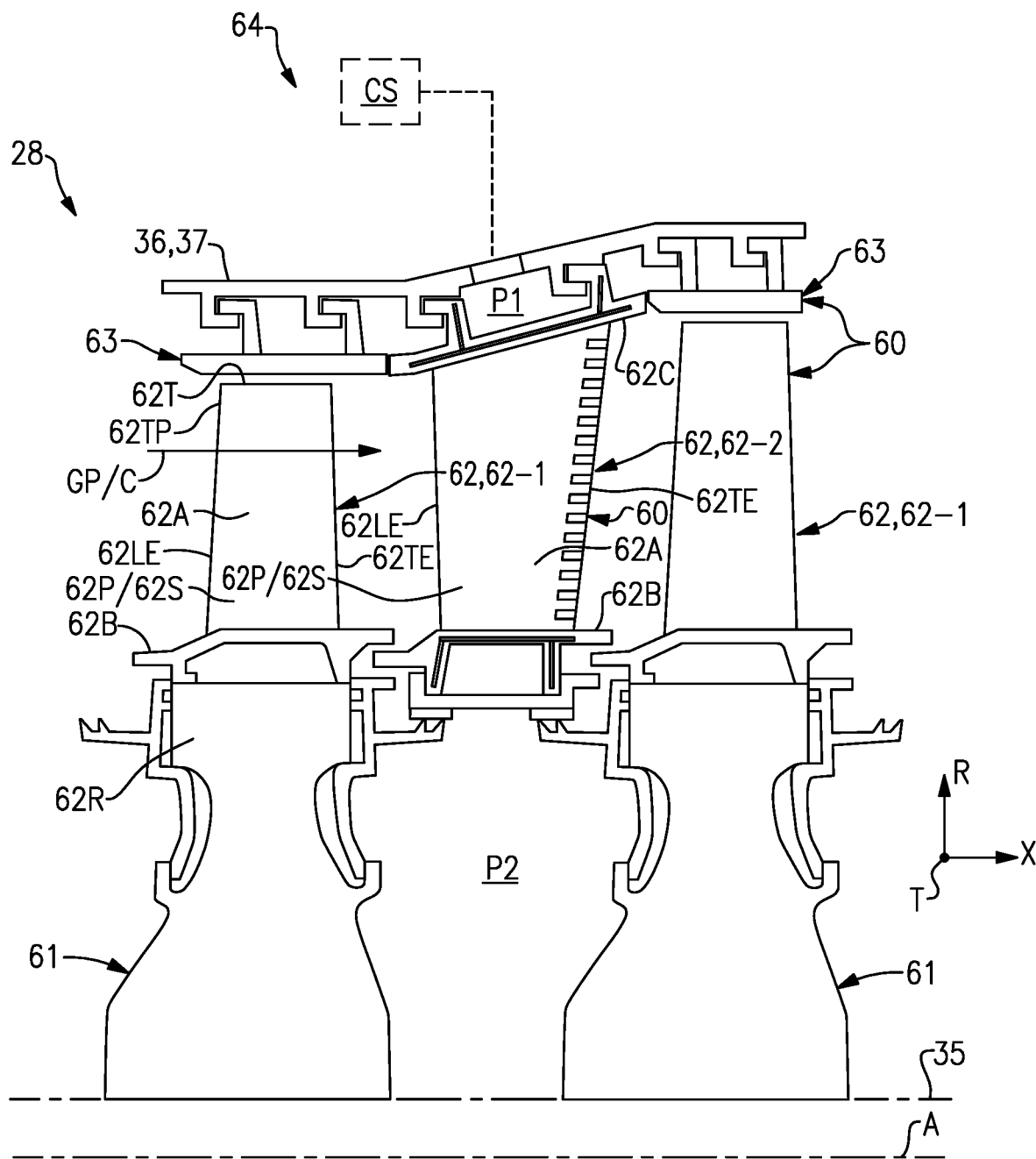
FIG. 2 schematically shows an airfoil arrangement.

FIG. 2 illustrates an exemplary section of a gas turbine engine, such as the turbine section 28 of FIG. 1. Although the disclosure primarily refers to the turbine section 28, it should be understood that other portions of the engine 20 can benefit from the teachings disclosed herein, including airfoils in the compressor section 24, combustor panels or liners in the combustor section 26, and other portions of the engine 20 that may be subject to elevated temperature conditions during engine operation. Other systems can benefit from the teachings disclosed herein, including gas turbine engines lacking a fan for propulsion.

The turbine section 28 includes a plurality of components 60 arranged relative to the engine axis A, including a rotor 61, one or more airfoils 62, and one or more blade outer air seals (BOAS) 63. Example airfoils 62 include rotatable blades 62-1 and static vanes 62-2. The rotor 61 is coupled to a rotatable shaft 35 (shown in dashed lines for illustrative purposes). The shaft 35 can be one of the shafts 40, 50 of FIG. 1, for example. The rotor 61 carries one or more blades 62-1 that are rotatable about the engine axis A in a gas path GP, such as the core flow path C.

Each airfoil 62 includes an airfoil section 62A extending in a spanwise or radial direction R from a first (e.g., inner) platform section 62B. Each blade 62-1 extends in the radial direction R from the platform section 62B to a tip portion 62TP. The tip portion 62TP establishes a tip 62T at a radially outermost position of the airfoil section 62A.

Each vane 62-2 extends in the radial direction R from the first platform section 62B to a second (e.g., outer) platform section 62C. The platform sections 62B, 62C can bound or define a portion of the gas path GP. The platform section 62B can be established between the airfoil section 62A and a root section 62R. The airfoil section 62A generally extends in a chordwise or axial direction X between a leading edge 62LE and a trailing edge 62TE, and extends in a circumferential or thickness direction T between pressure and suction sides 62P, 62S. The pressure and suction sides 62P, 62S are joined at the leading and trailing edges 62LE, 62TE to establish an aerodynamic surface contour of the airfoil 62.

The root section 62R of the blade 62-1 can be dimensioned to mount the blade 62-1 to a rotatable hub or another portion of the rotor 61. The root section 62R can be mounted to, or can be integrally formed with, the rotor 61. The vane 62-2 can be arranged to direct or guide flow in the gas path GP from and/or towards the adjacent blade(s) 62-1.

Each BOAS 63 can be spaced radially outward from the tip portion 62TP of the blade 62-1. The BOAS 63 can include an array of seal arc segments that are circumferentially distributed or arranged in an annulus about an array of the blades 62-1 to bound the gas path GP.

The turbine section 28 can include at least one array of airfoils 62, including at least one array of blades 62-1 rotatable about the engine longitudinal axis A and at least one array of vanes 62-2 adjacent to the array of blades 62-1. The section 28 can include at least one array of BOAS 63 arranged circumferentially about the engine axis A. The array of vanes 62-2 are spaced axially from the array of blades 62-1 relative to the engine axis A. The tips 62T of the blades 62-1 and adjacent BOAS 63 are arranged in close radial proximity to reduce the amount of gas flow that escapes around the tip portions 62TP through a corresponding clearance gap.

The turbine section 28 includes a cooling arrangement (or scheme) 64 for providing cooling augmentation to the components 60 during engine operation. The cooling arrangement 64 can include one or more cooling cavities or plenums P1, P2 defined by a portion of the engine static structure 36 such as the engine case 37. The plenum P2 can be at least partially defined or bounded by a rotatable portion of the engine 20, such as the rotor 61. One or more coolant sources CS (one shown in dashed lines for illustrative purposes) can be configured to provide cooling air to the plenums P1, P2. The plenums P1, P2 are configured to receive pressurized cooling flow from the coolant source(s) CS to cool portions of the components 60 including the airfoils 62 and/or BOAS 63. Coolant sources CS can include bleed air from an upstream stage of the compressor section 24 (FIG. 1), bypass air, or a secondary cooling system aboard the aircraft, for example. Each of the plenums P1, P2 can extend in the circumferential direction T between adjacent airfoils 62 and/or BOAS 63.

Figure 3:
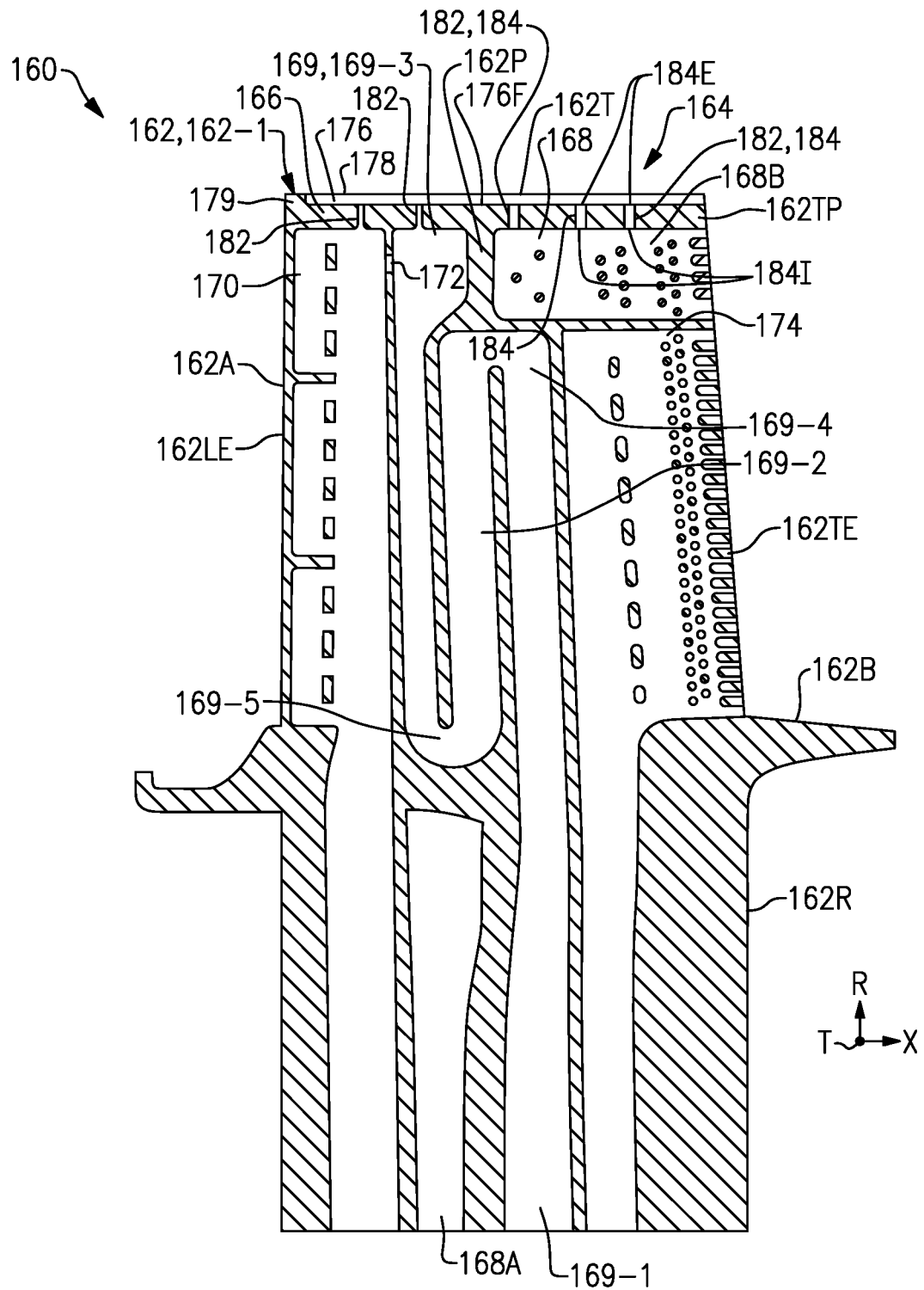
FIG. 3 illustrates a section view of a gas turbine engine component along line 3-3 of FIG. 5.
Figure 4:
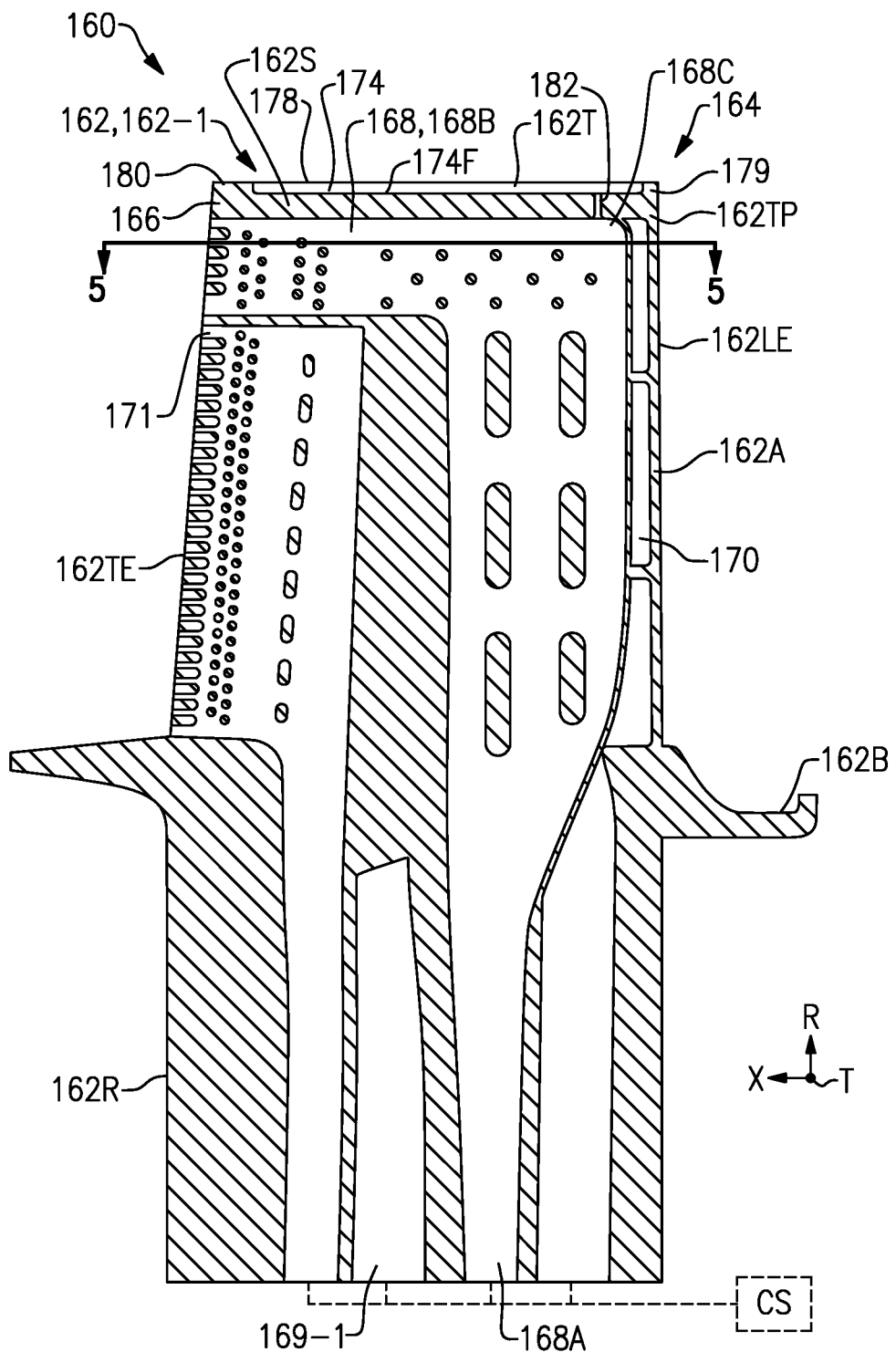
FIG. 4 illustrates another section view of the gas turbine engine component of FIG. 3 along line 4-4 of FIG. 5.

FIGS. 3-5 illustrate an exemplary gas turbine engine component 160 including an internal cooling arrangement 164. The component 160 can be any of the components disclosed herein, including a combustion liner or panel incorporated into the combustor section 26, and the BOAS 63 and airfoils 62 such as the blades 62-1 and vanes 62-2 of the turbine section 28. In the illustrative example of FIGS. 3-5, the component 160 is an airfoil 162 shown as a blade 162-1. The blade 162-1 can be a rotatable turbine blade incorporated into one or more rows of the turbine section 28. In this disclosure, like reference numerals designate like elements where appropriate and reference numerals with the addition of one-hundred or multiples thereof designate modified elements that are understood to incorporate the same features and benefits of the corresponding original elements.

Referring to FIGS. 3-4, the airfoil 162 includes an airfoil section 162A extending outwardly in a radial (e.g., first or spanwise) direction R from a root section 162R to a tip portion 162TP. The tip portion 162TP can establish a terminal end or tip 162T of the airfoil section 162A. The airfoil section 162A can extend outwardly in the radial direction R from a platform section 162B to the tip 162T. The platform section 162B is established between the airfoil section 162A and root section 162R relative to the radial direction R. The root section 162R can be dimensioned to extend inwardly from the platform section 162B relative to the radial direction R. The root section 162R can be dimensioned to mount the blade 162-1 to a rotatable hub.

The airfoil section 162A includes an external wall 166 and at least one internal wall (or rib) 167, as illustrated in FIG. 5. The external wall 166 can define pressure and suction sides 162P, 162S extending in a chordwise (e.g., second) direction X between a leading edge 162LE and a trailing edge 162TE. The pressure side 162P and suction side 162S can be spaced apart in a thickness (e.g., third) direction T between the leading edge 162LE and trailing edge 162TE. The pressure and suction sides 162P, 162S join at the leading and trailing edges 162LE, 162TE to establish an external surface contour of the airfoil 162.

The internal cooling arrangement 164 can include one or more cooling passages dimensioned to convey cooling flow to adjacent portions of the component 160. The cooling arrangement 164 can include a skin core (e.g., first or flag) cooling passage 168, a serpentine (e.g., second) cooling passage 169, a leading edge (e.g., third) cooling passage 170, and a trailing edge (e.g., fourth) cooling passage 171. The cooling passages 168, 169, 170, 171 can be coupled to a coolant source CS (shown in dashed lines in FIG. 4 for illustrative purposes) to convey cooling flow to adjacent portions of the component 160. It should be understood that one or more of the cooling passages 168, 169, 170 and/or 171 can be omitted and/or combined, and fewer or more than four cooling passages may be utilized in accordance with the teachings disclosed herein. The cooling arrangement 164 can be established by the airfoil section 162A, platform section 162B and/or root section 162R. The internal wall 167 can extend in the chordwise direction X to establish a double wall arrangement that partitions or otherwise separates portions of the cooling arrangement 164, as illustrated in FIG. 5.

The leading edge cooling passage 170 can be established adjacent to the leading edge 162LE of the airfoil 162. The trailing edge cooling passage 171 can be established adjacent to the trailing edge 162TE of the airfoil 162. The leading edge cooling passage 170 can be bounded by the external wall 166 along the leading edge 162LE (see also FIG. 5). The trailing edge cooling passage 171 can be bounded by the external wall 166 along the trailing edge 162TE. The serpentine cooling passage 169 can be situated between the leading edge cooling passage 170 and trailing edge cooling passage 171 relative to the chordwise direction X. The skin core cooling passage 168 can extend aft of the leading edge cooling passage 170 relative to the chordwise direction X. Portions of the skin core cooling passage 168 can be aligned with the serpentine cooling passage 169, leading edge cooling passage 170 and/or trailing edge cooling passage 171 relative to the chordwise direction X. The cooling arrangement 164 can include at least one crossover passage 172 extending between and interconnecting the serpentine cooling passage 169 and leading edge cooling passage 170, as illustrated in FIG. 3. In other examples, each crossover passage 172 is omitted.

Referring to FIG. 4, with continuing reference to FIG. 3, the skin core cooling passage 168 can include a radial (e.g., first) section 168A and a tip flag (e.g., second) section 168B joined at a first bend (or junction) 168C. The first section 168A can extend in the radial direction R from the root section 162R. The tip flag section 168B can be established along or can otherwise be adjacent to the tip portion 162TP of the airfoil 162. The tip flag section 168B can be dimensioned to extend in the chordwise direction X along the tip portion 162TP from the first section 168A at the first bend 168C to the trailing edge 162TE of the airfoil 162 (see also FIG. 5). The tip flag section 168B can extend transversely, such as at an approximately 90 degree angle, from the first section 168A at the first bend 1680C. For the purposes of this disclosure, the terms "approximately," "about" and "substantially" mean±10 percent of the stated value or relationship unless otherwise indicated. Arrangement of the tip flag section 168B in a substantially axial or chordwise direction X can be utilized to increase internal convective heat transfer adjacent the tip portion 162TP, which may have a relative lesser thickness than other portions of the airfoil 162.

Referring back to FIG. 3, the serpentine cooling passage 169 can include a plurality of sections interconnected by one or more bends. For example, the serpentine cooling passage 169 can include a first section 169-1, second section 169-2, and third section 169-3. The second section 169-2 can be dimensioned to interconnect the first section 169-1 and third section 169-3. The first section 169-1 can be dimensioned to extend outwardly from the root section 162R relative to the radial direction R. The second section 169-2 can be dimensioned to extend inwardly from the tip portion 162TP relative to the radial direction R. The third section 169-3 can be dimensioned to substantially span between the platform section 162B and tip portion 162TP. The first section 169-1 can be joined to the second section 169-2 at a bend 169-4. The third section 169-3 can be joined to the second section 169-2 at another bend 169-5. Each of the bends 169-4, 169-5 can be dimensioned to turn approximately 180 degrees such that the bends 169-4, 169-5 have a generally C-shaped geometry. The third section 169-3 can be forward of the first section 169-1 relative to the chordwise direction X, as illustrated in FIG. 3, although the opposite arrangement can be utilized.

The double wall arrangement established by the skin core cooling passage 168 relative to the internal wall 167 can serve to at least partially thermally isolate or shield adjacent portions of the serpentine cooling passage 169 and/or leading edge cooling passage 170 from elevated temperatures caused by hot gases communicated along exposed surfaces of the airfoil 162, such as along the suction side 162S of the airfoil 162. The internal wall 167 can extend inwardly from the tip portion 162TP relative to the radial direction R (see, e.g., internal wall 267 of FIG. 7). The tip flag section 168B of the skin core cooling passage 168 can be situated on an opposite side of the internal wall 167 from portions of the serpentine cooling passage 169 and/or leading edge cooling passage 170 relative to the thickness direction T, as illustrated in FIG. 5. At least the third section 169-3 of the serpentine cooling passage 169 and/or portions of the leading edge cooling passage 170 can be established between the internal wall 167 and the pressure side 162P, and the tip flag section 168B can be established between the internal wall 167 and the suction side 162S, as illustrated in FIG. 5, although the opposite arrangement can be utilized. The shielding can reduce heat pickup of cooling flow in the serpentine cooling passages 169 and/or leading edge cooling passage 170 by reducing net heat flux from the relatively hot external wall 166 along adjacent surfaces of the suction side 162S. Reduction in heat pickup of the cooling flow can improve cooling effectiveness by increasing the potential temperature gradient between the external gasses and the relatively cooler internal cooling flow through the cooling arrangement 164.

The tip portion 162TP of the airfoil 162 can include one or more features to improve cooling augmentation of adjacent portions of the airfoil 162. The tip portion 162TP can include a tip (or squealer) pocket 174 (FIG. 4) and a tip shelf 176 (FIG. 3). The tip pocket 174 and tip shelf 176 can be dimensioned to extend inwardly from the tip 162T relative to the radial direction R. The tip pocket 174 can be dimensioned to extend in the radial direction R from a pocket floor 174F to the tip 162T. The tip shelf 176 can be dimensioned to extend in the radial direction R from a shelf floor 176F to the tip 162T. The tip pocket 174 can be dimensioned to extend in the chordwise direction X between a leading edge lip 179 and a trailing edge lip 180. The tip shelf 176 can be dimensioned to extend between the leading edge lip 179 and the trailing edge 162TE. The tip pocket 174 and tip shelf 176 can be established on opposite sides of a common shelf wall 178. The shelf wall 178 can be dimensioned to extend between the leading edge lip 179 and trailing edge lip 180. Incorporating the tip pocket 174 and tip shelf 176 into the tip portion 162TP of the airfoil 162 can be utilized to reduce thermal mass adjacent the tip 162T, which can serve to reduce thermal transient strains between the external wall 166 at the tip 162T and the pressure and suction sides 162P, 162S, which may have relatively thinner walls thicknesses than adjacent portions of the external wall 166.

The tip pocket 174 and/or tip shelf 176 can be coupled to at least one or more cooling passages 182. The cooling passages 182 can be dimensioned to interconnect the tip pocket 174 and/or tip shelf 176 with an internal cooling cavity of the internal cooling arrangement 164. The internal cooling cavity can be established by the skin core cooling passage 168, serpentine cooling passage 169 and/or leading edge cooling passage 170, for example. The cooling passages 182 are dimensioned to convey cooling flow from the coolant source CS (FIG. 4) to the tip pocket 174 and/or tip shelf 176 in operation to provide cooling augmentation to adjacent portions of the airfoil 162 and to establish a sealing arrangement along a clearance gap between the tip 162T and an adjacent blade outer air seal (see FIG. 2). The cooling passages 182 can be formed utilizing various techniques, including a casting or drilling operation.

In operation, cooling flow can be conveyed by the coolant source CS (FIG. 4) to the cooling passages 168, 169, 170, 171 at one or more inlets or plenums established in the root section 162R. The cooling flow can be communicated to downstream portions of the cooling passages 168, 169, 170, 171 to provide cooling augmentation to adjacent portions of the airfoil 162. At least one of the serpentine cooling passage 169 and/or leading edge cooling passage 170 can be at least partially thermally shielded by the skin core cooling passage 168 and internal wall 167. After picking up heat due to convective heat transfer, the cooling airflow can be ejected from the cooling passages 182 into the tip pocket 174 and/or tip shelf 176 to provide cooling augmentation to the tip portion 162TP of the airfoil 162. The cooling flow can be communicated to a clearance gap between the tip 162T and an adjacent blade outer air seal (see FIG. 2) and/or the adjacent gas path.

Figure 7:
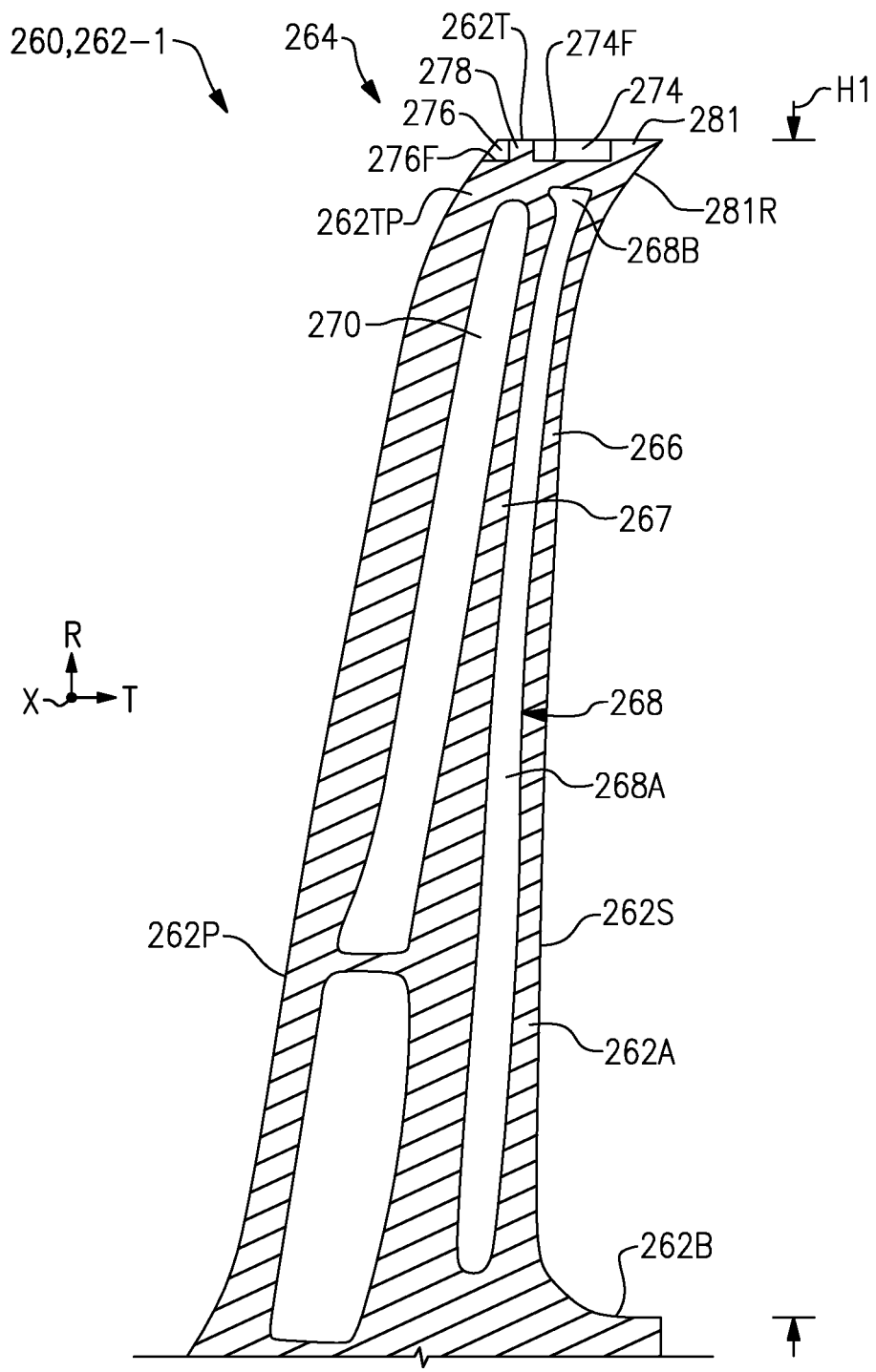
FIG. 7 is a sectional view taken along line 7-7 of the component of FIG. 6.
Figure 8:
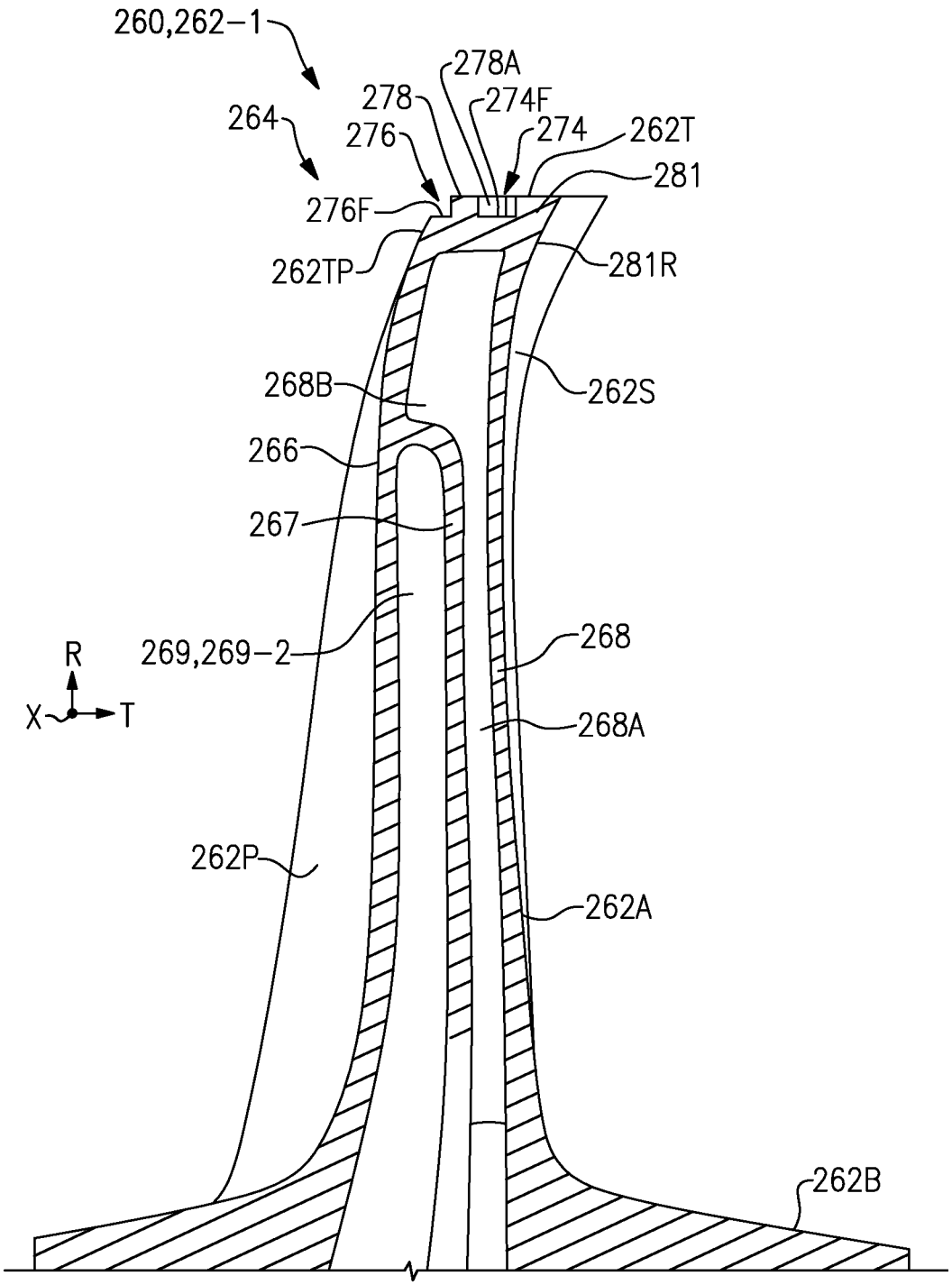
FIG. 8 is a sectional view taken along line 8-8 of the component of FIG. 6.

FIGS. 6-8 illustrate an exemplary component 260 for a gas turbine engine. In the illustrative example of FIGS. 6-8, the component 260 is an airfoil 262 such as a rotatable blade 262-1. The blade 262-1 can be a rotatable turbine blade incorporated into one or more rows of the turbine section 28.

The blade 262-1 includes an airfoil section 262A that establishes an internal cooling arrangement 264. The internal cooling arrangement 264 can include one or more cooling passages dimensioned to convey cooling flow to adjacent portions of the airfoil 262. The cooling arrangement 264 can include a skin core (e.g., first) cooling passage 268, a serpentine (e.g., second) cooling passage 269, a leading edge (e.g., third) cooling passage 270, and a trailing edge (e.g., fourth) cooling passage 271. A volume of each of the passages 268, 269, 270, 271 is depicted in dashed lines in FIG. 6. Passages 268, 270 are shown in FIG. 7. Passages 268, 269 are shown in FIG. 8. The passages 268, 269, 270, 271 can be dimensioned and arranged utilizing any of the techniques disclosed herein.

The airfoil section 262A can include an external wall 266 and an internal wall 267. The internal wall 267 can extend inwardly from the tip portion 262TP with respect to a radial direction R, as illustrated in FIGS. 7-8. A tip flag section 268B of the skin core cooling passage 268 can be situated on an opposite side of the internal wall 267 from portions of the serpentine cooling passage 269 and/or leading edge cooling passage 270 relative to the thickness direction T, also as illustrated in FIG. 7.

The tip portion 262TP of the airfoil section 262A can include a tip pocket 274 and a tip shelf 276 extending inwardly from a tip 262T relative to the radial direction R. The tip pocket 274 can be dimensioned to extend in a chordwise direction X between a leading edge lip 279 and a trailing edge lip 280 that cooperate to bound the tip pocket 274, as illustrated in FIG. 6. The tip shelf 276 can be dimensioned to extend between the leading edge lip 279 and a trailing edge 262TE of the airfoil section 262A, also illustrated in FIG. 6. The tip pocket 274 and tip shelf 276 can be established on opposite sides of a common shelf wall 278. The shelf wall 278 can be dimensioned to extend between the leading edge lip 279 and trailing edge lip 280. The tip pocket 274 extends in the radial direction R from a pocket floor 274F to the tip 262T. The shelf wall 278 extends in the radial direction R from a shelf floor 276F to the tip 262T.

The tip pocket 274 can be bounded in a thickness direction T between the shelf wall 278 and a sidewall 281 opposed to the shelf wall 278. The shelf wall 278, sidewall 281, leading edge lip 279 and trailing edge lip 280 cooperate to encircle or surround the tip pocket 274 relative to the thickness direction T and chordwise direction X. The sidewall 281 can extend along and establish a pressure side 262P of the airfoil section 262A, and the tip shelf 276 can extend inwardly from a suction side 262S of the airfoil section 262A, although an opposite arrangement can be utilized. The tip flag section 268B and the serpentine cooling passage 269 can be situated on opposite sides of the internal wall 267 relative to the thickness direction T at a position substantially aligned with the tip pocket 274 relative to the chordwise direction X, as illustrated by 8.

The tip portion 262TP can include at least one or more cooling passages 282, as illustrated in FIG. 6. The tip shelf 276 can be coupled to one or more of the cooling passages 282. The cooling passages 282 can be dimensioned to interconnect the tip shelf 276 with an internal cooling cavity of the internal cooling arrangement 264 established by the airfoil section 262A, such as the leading edge cooling cavity 270 and/or serpentine cooling cavity 269. Each cooling passage 282 can extend between a respective inlet port 282I and exit port 282E. Each inlet port 282I can be coupled to the internal cavity established by the airfoil section 262A. The exit ports 282E can be distributed or otherwise established along the shelf floor 276F of the tip shelf 276.

The cooling passages 282 can include a first cooling passage 282-1 and a second cooling passage 282-2. The first cooling passage 282-1 can have an inlet port 282I established along the leading edge cooling passage 270. The second cooling passage 282-2 can have an inlet port 282I established along the third section 269-3 of the serpentine cooling passage 269. The cooling passages 282-1, 282-2 can serve as purge passages dimensioned to eject dirt and other particulate from the cooling passages 269, 270 in operation, which can reduce a likelihood of blockage. The cooling passages 282-1, 282-2 may be established by an extension from the respective cores utilized to position the cores during formation of the cooling passages 269, 270, which can simplify formation of the cooling passages 282-1, 282-2 and improve core positioning.

The shelf wall 278 can have various geometries to establish a boundary of the tip pocket 274 and tip shelf 276. The sidewall 281 can establish a first width W1 at the tip 262T, and the shelf wall 278 can establish a second width W2 at the tip 262T, as illustrated in FIG. 6. The sidewall 281 and shelf wall 278 can be dimensioned such that a maximum value of the first width is greater than a maximum value of the second width W2 of the shelf wall 278 at positions between the leading edge lip 279 and trailing edge lip 280. The first width W1 of the shelf wall 278 at the tip 262T can be dimensioned to vary no more than 10 percent between the leading and trailing edge lips 279, 280 such that the shelf wall 278 has a substantially constant thickness.

The shelf wall 278 can be dimensioned to have a serpentine profile. The shelf wall 278 can include a plurality of undulations dimensioned to follow a perimeter of the respective exit ports 282E to establish the serpentine profile, as illustrated in FIG. 6. The shelf wall 278 can include one or generally linear and/or curvilinear sections 278L and one or more arcuate sections 278A. One or more of the arcuate sections 278A can be dimensioned to follow the perimeter of a respective exit port 282E to establish the serpentine profile. Each arcuate section 278A can extend in an arc path that is greater than or equal to 135 degrees, such as approximately 180 degrees, to substantially follow the perimeter of the respective exit port 282E. The arcuate section 278A can be offset a distance from a rim of the respective exit port 282E.

The tip portion 262TP can have various geometries. Referring to FIGS. 7-8, with continuing reference to FIG. 6, the tip pocket 274 is bounded in the thickness direction T between the shelf wall 278 and the sidewall 281. The tip flag section 268B of the skin core cooling passage 268 can be at least partially aligned with the pocket floor 274F of the tip pocket F relative to the thickness direction T. A radial face 281R of the sidewall 281 can be substantially vertical or can be contoured in the radial direction R. The radial face 281R can be established outward of the tip flag section 268B relative to the thickness direction T such that the tip 262T is overhung.

Figure 9:
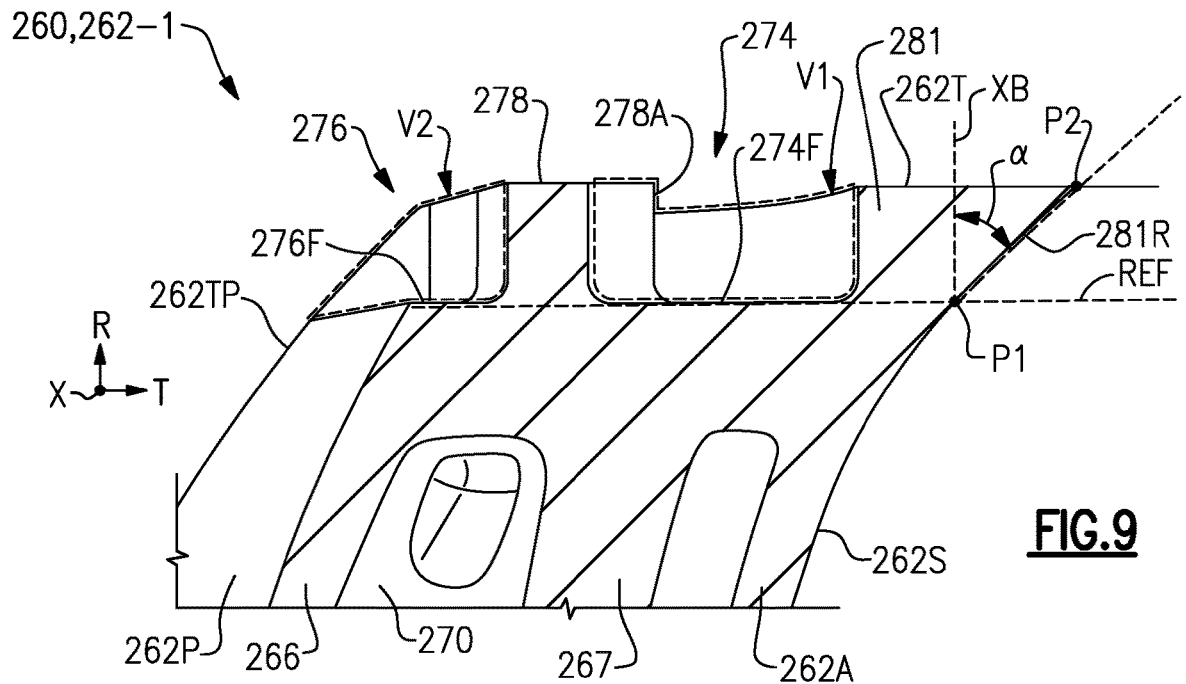
FIG. 9 is a sectional view of a tip portion of the component of FIG. 6 illustrating tip bow.
Figure 10:
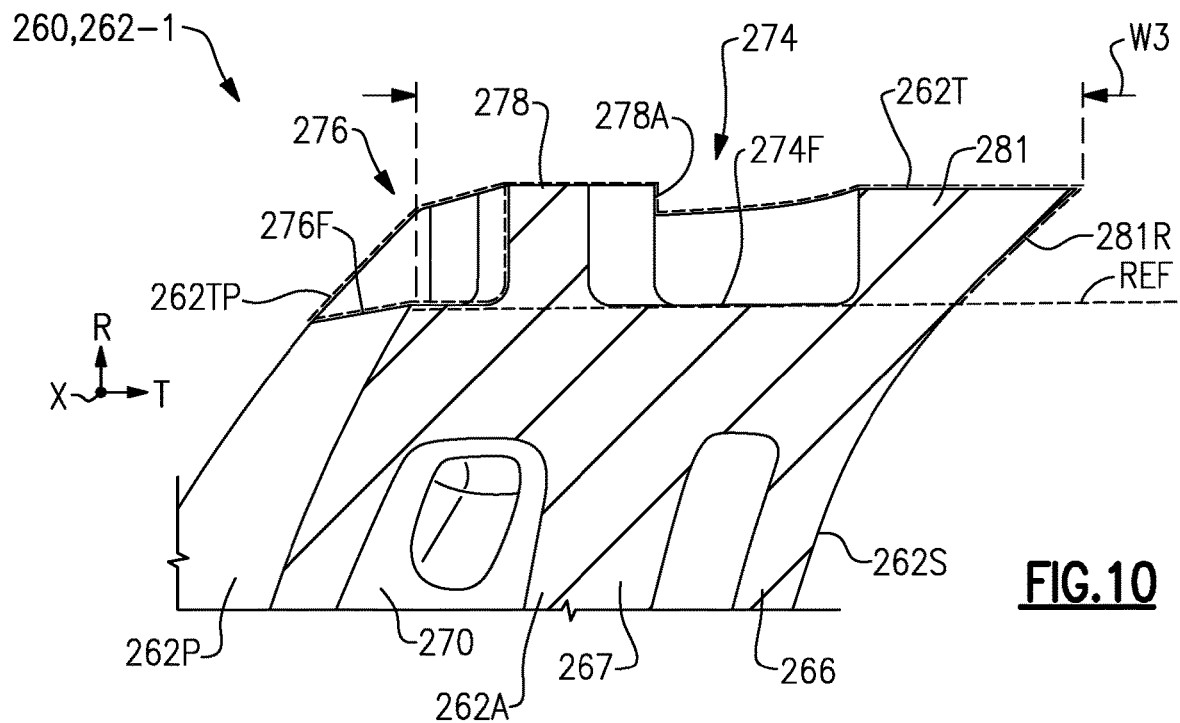
FIG. 10 is a sectional view illustrating an exemplary width of the tip portion of FIG. 9.

The radial face 281R of the sidewall 281 can extend between a first position P1 and a second position P2 at the tip 262T, as illustrated in FIG. 9. The tip portion 262TP can be dimensioned such that the second position P2 is outward of the first position P1 with respect to the thickness direction T to establish a bowed tip arrangement. The pocket floor 274F can extend along a reference plane REF that extends in the thickness and chordwise directions T, X (FIGS. 9-10). The first position P1 can correspond to a span position of the pocket floor 274F relative to the radial direction R, with the reference plane REF intersecting the first position P1. In examples, the first position P1 corresponds to a span position that is greater than or equal to about 95 percent of an entire span of the airfoil section 262A between the platform section 262B and the tip 262T relative to the radial direction R.

A bow angle α can be established between the first position P1 and the second position P2 relative to a radial (or bow) axis XB extending in the radial direction R. The bow angle α may be taken at a chord position relative to the chordwise direction X corresponding to a maximum value of the bow angle α. The bow angle α can be greater than or equal to 10 degrees, or more narrowly less than or equal to 45 degrees. In examples, the bow angle α is less than or equal to 30 degrees.

The disclosed tip bow features can promote radial flow over the surface of the tip 262T of the airfoil 262. The tip bow features can be utilized to increase a radial height and internal convective surface area of the tip flag section 268B of the skin core cooling passage 268, which can improve cooling augmentation of adjacent portions of the airfoil 262. The tip bow may be utilized to reduce a radial height and/or chordwise length of portions of the serpentine cooling passage, such as the first and second sections 269-1, 269-2 of the serpentine cooling passage 269 situated radially inward of the tip flag section 268B of the skin core cooling passage 268 (FIGS. 6 and 8), which can reduce cooling air heat pick up in serpentine cooling passage 269 prior to being ejected into the tip shelf 276.

The tip pocket 274 and tip shelf 276 can be dimensioned to reduce a thermal mass of the tip portion 262TP of the airfoil 262. The tip pocket 274 can establish a first volume V1, and the tip shelf 276 can establish a second volume V2 (shown in dashed lines in FIG. 9. The volumes V1, V2 can be established between the tip 262T and the respective tip and shelf floors 274F, 276F. The tip portion 262TP between the reference plane REF and tip 262T can establish a third volume V3 (shown in dashed lines in FIG. 10). The airfoil 262 can be dimensioned to establish a ratio (V1+V2):V3 of a summation of the volumes V1, V2 of the tip pocket 274 and tip shelf 276 divided by the volume V3 of the tip portion 262TP. The ratio (V1+V2):V3 can be greater than or equal to 0.30, or more narrowly greater than or equal to 0.40. The ratio (V1+V2):V3 can be less than or equal to 0.50.

The radial face 281R of the sidewall 281 can have an arcuate profile that slopes outwardly from the first position P1 to the second position P2. An average of the slope of the radial face 281R can be greater than or equal to 10 degrees, or more narrowly less than or equal to 30 degrees with respect to the radial axis XB. The slope can progressively increase from the first position P1 to the second position P2.

The tip portion 262TP can have a relatively wide geometry to facilitate establishing the double wall arrangement of the skin core cooling passage 268, serpentine cooling passage 269 and/or leading edge cooling passage 270 relative to the internal wall 267. The tip portion 262TP extends in the thickness direction T between the pressure and suction sides 262P, 262S to establish a third width W3 (FIG. 10). The third width W3 is measured at a radially innermost span position of the pocket floor 274F relative to the radial direction R, which is established along the reference plane REF. The airfoil section 262A extends in the radial direction R from the platform section 262B to the tip 262T to establish a first height H1 (FIG. 7). A ratio W3:H1 of the third width W3 to the first height H1 can be equal to or greater than 0.02, or more narrowly greater than or equal to 0.05. The ratio W3:H1 can be less than or equal to 0.20, or more narrowly less than or equal to 0.10. Utilizing the techniques disclosed herein, the airfoil 262 can be dimensioned to have a relatively wide tip portion 262TP, which can facilitate packaging of the cores associated with the skin core cooling passage 268, serpentine cooling passage 269 and/or leading edge cooling passage 270 to establish a double wall arrangement, which can provide shielding of the leading edge cooling passage 270 and sections of the serpentine cooling passage 269.

Figure 11:
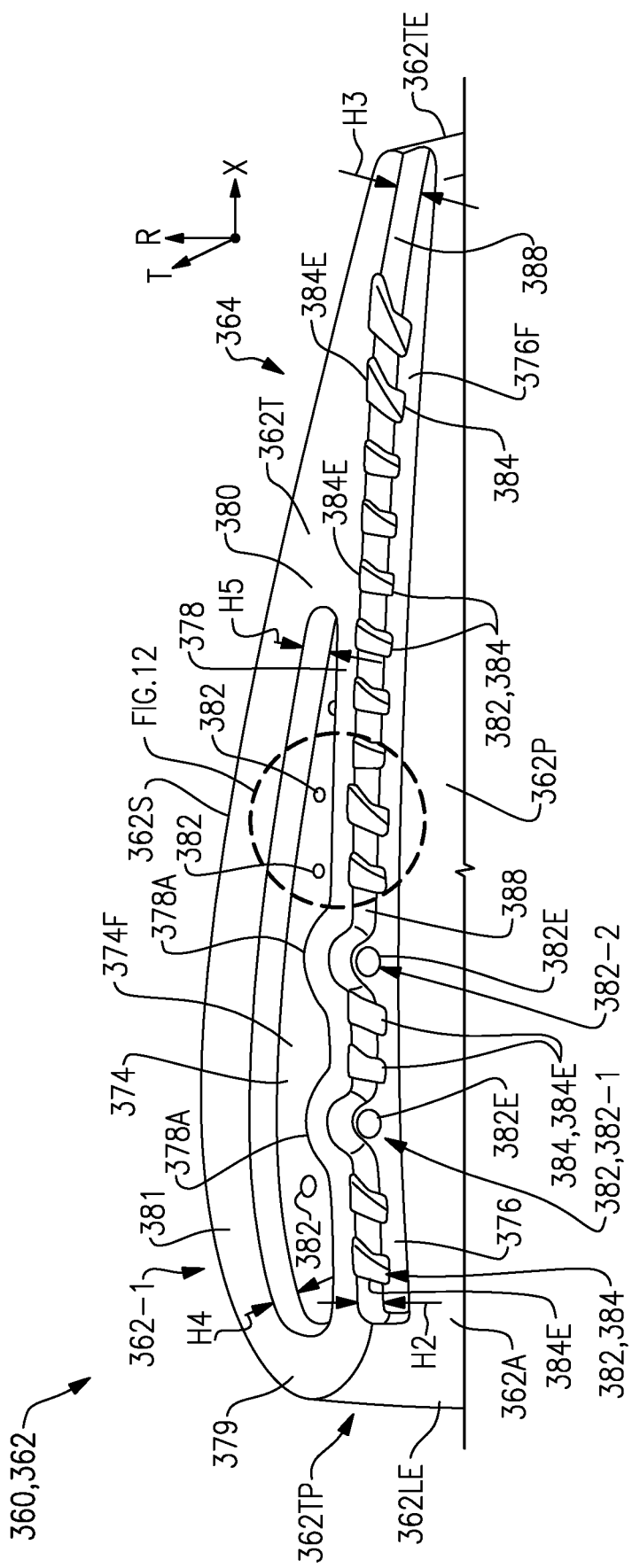
FIG. 11 illustrates another exemplary gas turbine engine component including a tip arrangement.

FIG. 11 illustrate another exemplary component 360 for a gas turbine engine. In the illustrative example of FIG. 11, the component 360 is an airfoil 362 such as a rotatable blade 362-1. The blade 362-1 can be a rotatable turbine blade incorporated into one or more rows of the turbine section 28 (FIG. 1). The blade 362-1 includes an airfoil section 362A that establishes an internal cooling arrangement 364.

A tip portion 362TP of the airfoil 362 can include a tip pocket 374 and tip shelf 376 on opposite sides of a shelf wall 378. A radial face 388 of the shelf wall 378 can be dimensioned to have a substantially constant height at positions along a length of the shelf wall 378, as illustrated by a second height H2 adjacent the leading edge 362LE and a third height H3 adjacent the trailing edge 362TE. A pocket floor 374F of the tip pocket 374 can have a substantially planar geometry or can have a conical geometry. A sidewall 381 bounding the tip pocket 374 can be dimensioned to have a height that varies at positions along a length of the sidewall 381, as illustrated by a fourth height H4 adjacent a leading edge lip 379 and a fifth height H5 adjacent to a trailing edge lip 380. The pocket floor 374F can be dimensioned to slope inwardly from the leading edge lip 379 to the trailing edge lip 380 such that the fifth height H5 is greater than the fourth height H5. The pocket floor 374F can be dimensioned to slope progressively inwardly to establish a conical geometry.

The tip portion 362TP can include at least one or more cooling passages 382. The tip pocket 374 and/or tip shelf 376 can be coupled to one or more of the cooling passages 382. Each cooling passage 382 can extend along a passage axis PA (FIG. 12) between a respective inlet port (see FIG. 6) and exit port 382E. The cooling passages 382 can include a first set of cooling passages, such as cooling passages 382-1, 382-2. The cooling passages 382 can include a second set of cooling passages, indicated at 384, with corresponding exit ports 384E. The cooling passages 384 can have respective inlet ports established along the tip flag section, as illustrated by inlet ports 184I of cooling passages 184 (FIG. 3). The exit ports 382E/384E can be distributed or otherwise established along the shelf floor 376F. Two or more of the exit ports 382E, 384E can be distributed in a row along the floor 376F of the tip shelf 376. One or more exit ports 384E of the cooling passages 384 can be established between the exit ports 382E of the cooling passages 382 and arcuate sections 378A of the shelf wall 378.

Figure 12:
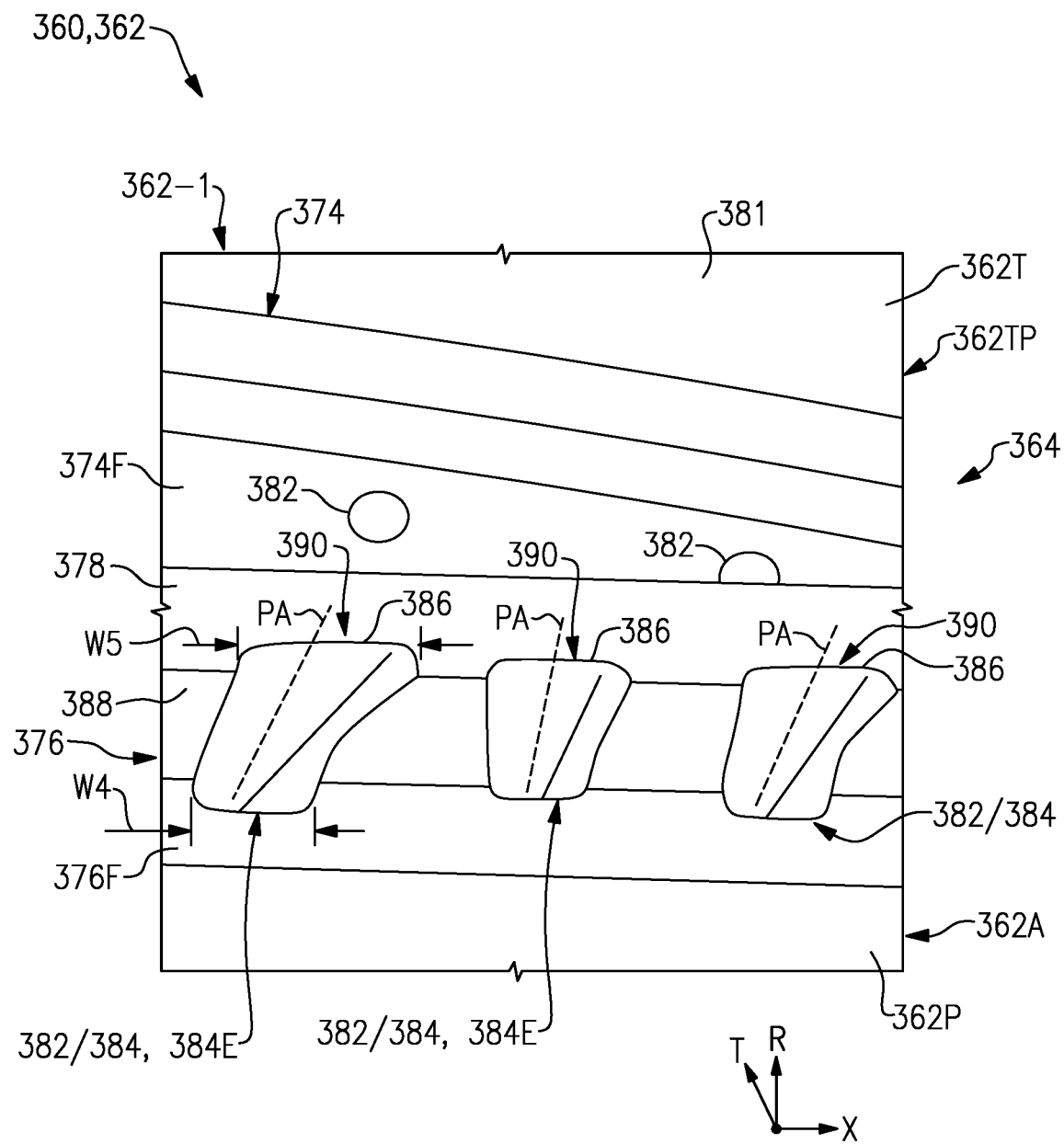
FIG. 12 illustrates selected portions of the component of FIG. 11.

Referring to FIG. 12, with continuing reference to FIG. 11, the exit ports 384E can have various geometries to provide cooling augmentation to adjacent portions of the airfoil 362. One or more of the exit ports 384E can have a trenched section 386 extending from the shelf floor 376F along the radial face 388 of the shelf wall 378 to the tip 362T. The trenched section 386 can be a recess or groove dimensioned to extend inwardly from the radial face 388 of the shelf wall 378.

The trenched section 386 can be dimensioned to expand or flair outwardly in the radial direction R from the shelf floor 376F to the tip 362T. The trenched section 386 can establish a fourth width W4 at the shelf floor 376F and a fifth width W5 at the tip 362T. The fifth width W5 can be greater than the fourth width W4 to establish a diffuser 390. The widths W4, W5 of the exit ports 384E can be the same or can differ. The diffuser 390 can be dimensioned to expand cooling flow from the respective cooling passage 384 prior to being ejected radially outwardly of the tip 362T. The passage axis PA of one or more of the cooling passages 384 can have a component that extends aftwards relative to the chordwise direction X. The trenched cooling holes 384 can be utilized to provide substantially continuous high coverage film cooling augmentation, which may reduce external heat flux along the tip 362T and adjacent surfaces of the tip portion 362TP. Utilizing the techniques disclosed herein, including the dimensioning and arrangement of the cooling passages 382, such as the passages 382-1, 382-2, 384, the thermal cooling and film effectiveness of the cooling passages can reduce a net heat flux by improving the overall tip film effectiveness.

Utilizing the techniques disclosed herein, cooling effective can be improved, which can reduce a likelihood of oxidation of the blade tips that may otherwise be caused by tip rub spalling of a coating and a degradation in film cooling effectiveness. Cooling passages or holes can be established along the tip shelf, which can reduce a likelihood of blockage by tip rub. Cooling airflow can be communicated to the tip pocket, which can improve cooling of the localized blade tip and an adjacent blade outer air seal. The double wall arrangement can be utilized to establish relatively higher cooling flow Mach numbers and higher internal heat transfer from the cooling flow at the blade tip as well as less heat pick-up of the cooling flow prior to be ejected from the airfoil. A tip flag cooling passage can be incorporated to omit dead-end passages local to the tip portion where there may be reduced internal cooling effectiveness. Incorporating a pressure side tip shelf in conjunction with an axial flowing tip flag section can improve pressure side tip shelf film cooling and internal local wetted area, which can be utilized to tailor local convective heat transfer and cooling air pickup. Incorporating a pressure side tip shelf with a bowed airfoil configuration can induce a higher degree of radial flow along the airfoil pressure side tip region of the airfoil. Incorporating a tip bow can increase blade performance and promote radial flow over the tip surface. The trenched cooling passages can be utilized to improve tip film coverage along an increased circumferentially extending blade tip surface established by the aerodynamic tip bow.

A volume of the tip pocket can be increased to reduce an amount of thermal mass locally in the tip portion of the airfoil, which can be utilized to more closely match the thermal mass and transient response to the local airfoil pressure and suction side walls which can reduce local temperature gradients that may be produced by non-uniform transient thermal responses characteristic of high mass features immediate adjacent to low mass features. Having more closely matched thermal response time constants can reduce a likelihood of blade tip thermal mechanical fatigue which may result in premature crack initiation, cross propagation and blade tip oxidation. The disclosed tip pockets may be utilized to establish a locally thicker suction side tip wall and larger surface area, which may increase local blade solidity for improved tip cutting into an adjacent surface of a blade outer air seal. The increase in local suction side tip surface area can reduce a likelihood of eroding, rubbing and/or rolling of the extended suction side tip wall immediately adjacent to the tip pocket, which may improve robustness. A more robust configuration can improve tip clearance retention during extended engine operation and local stage and turbine efficiency.

The features can be incorporated into a single airfoil design, which can have synergistic benefits including improved blade tip cooling augmentation and component durability.

It should be understood that relative positional terms such as "forward," "aft," "upper," "lower," "above," "below," and the like are with reference to the normal operational altitude of the engine and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil for a gas turbine engine comprising:
a platform section;
an airfoil section extending in a spanwise direction from the platform section to a tip portion establishing a tip, the airfoil section having an external wall defining pressure and suction sides extending in a chordwise direction between a leading edge and a trailing edge, and the pressure and suction sides spaced apart in a thickness direction between the leading edge and the trailing edge;
wherein the tip portion includes a tip pocket and a tip shelf extending inwardly from the tip, the tip pocket and tip shelf on opposite sides of a shelf wall, and the shelf wall has a serpentine profile; and
wherein the platform section is established between the airfoil section and a root section, the root section dimensioned to mount the airfoil to a rotatable hub, the airfoil section includes an internal wall extending inwardly from the tip portion with respect to the spanwise direction, and the airfoil section establishes an internal cooling arrangement comprising:
a flag cooling passage including a first section and a tip flag section, the first section extending in the spanwise direction from the root section, and the tip flag section extending in the chordwise direction along the tip portion from the first section to the trailing edge;
a serpentine cooling passage including a plurality of sections interconnected by one or more bends; and
the tip flag section and the serpentine cooling passage are situated on opposite sides of the internal wall relative to the thickness direction at a position aligned with the tip pocket relative to the chordwise direction.

2. The airfoil as recited in claim 1, wherein the tip portion includes at least one cooling passage extending between an inlet port and an exit port, the inlet port is coupled to an internal cavity established in the airfoil section, the exit port is established along a shelf floor of the tip shelf, and the shelf wall includes an arcuate section dimensioned to follow a perimeter of the exit port to establish the serpentine profile.

3. The airfoil as recited in claim 2, wherein the shelf wall extends in the chordwise direction from a leading edge lip to a trailing edge lip that cooperate to bound the tip pocket, and a width of the shelf wall at the tip varies no more than 10 percent between the leading and trailing edge lips.

4. The airfoil as recited in claim 1, wherein the tip portion includes a plurality of cooling passages having respective exit ports distributed along the shelf floor of the tip shelf, each of the exit ports having a trenched section extending from the shelf floor along a radial face of the shelf wall to the tip.

5. The airfoil as recited in claim 1, wherein the tip flag section is established between the internal wall and the suction side, and the serpentine cooling passage is established between the internal wall and the pressure side.

6. The airfoil as recited in claim 1, wherein:
the tip portion includes at least one cooling passage extending between an inlet port and an exit port, the inlet port is established along the serpentine cooling passage, the exit port is established along a shelf floor of the tip shelf, and the shelf wall includes an arcuate section dimensioned to follow a perimeter of the exit port to establish the serpentine profile; and
the tip portion includes a plurality of cooling passages having respective inlet ports established along the tip flag section and having respective exit ports distributed in a row along the shelf floor of the tip shelf, and each of the exit ports having a trenched section extending from the shelf floor along a radial face of the shelf wall to the tip.

7. The airfoil as recited in claim 6, wherein the trenched section establishes a first width at the shelf floor and a second width at the tip, and the second width is greater than the first width to establish a diffuser.

8. The airfoil as recited in claim 1, wherein the airfoil is a turbine blade.

9. A gas turbine engine comprising:
a compressor section including a compressor;
a turbine section including a turbine coupled to the compressor;
wherein the turbine section includes an array of blades rotatable about a longitudinal axis and an array of vanes adjacent to the array of blades; and
wherein each blade of the array of blades comprises:
an airfoil section extending in a radial direction from a root section to a tip portion establishing a tip, the airfoil section having an external wall defining pressure and suction sides extending in a chordwise direction between a leading edge and a trailing edge, and the pressure and suction sides spaced apart in a thickness direction between the leading edge and the trailing edge;
a platform section between the root section and the tip portion relative to the radial direction;
wherein the tip portion includes a tip pocket and a tip shelf extending inwardly from the tip, and the tip pocket and tip shelf are established on opposite sides of a shelf wall;
wherein the tip pocket is bounded in the thickness direction between the shelf wall and a sidewall, the tip pocket extends in the radial direction from a pocket floor to the tip, a radial face of the sidewall slopes outwardly from a first position to a second position at the tip, the first position corresponds to a span position of the pocket floor relative to a radial axis extending in the radial direction, and an average of a slope of the radial face between the first and second positions is greater than or equal to 10 degrees.

10. The gas turbine engine as recited in claim 9, wherein the shelf wall has a serpentine profile.

11. The gas turbine engine as recited in claim 10, wherein the tip section includes a plurality of cooling passages having respective exit ports along a shelf floor of the tip shelf, and the shelf wall includes a plurality of undulations dimensioned to follow a perimeter of the respective exit ports to establish the serpentine profile.

12. The gas turbine engine as recited in claim 11, wherein the tip portion includes a plurality of cooling passages having respective exit ports distributed along the shelf floor of the tip shelf, each of the exit ports of having a trenched section extending from the shelf floor along a radial face of the shelf wall to the tip, and the trenched section of one or more of the cooling passages are established between the undulations.

13. The gas turbine engine as recited in claim 9, wherein:
the average of the slope is less than or equal to 30 degrees with respect to the radial axis;
the tip pocket extends in the radial direction from a pocket floor to the tip; and
the tip flag extends in the thickness direction between the pressure and suction sides to establish a width, the width measured at an innermost position of the pocket floor relative to the radial direction, the airfoil section extends in the radial direction from the platform section to the tip to establish a height, and a ratio of the width to the height is equal to or greater than 0.1.

14. The gas turbine engine as recited in claim 9, wherein the platform section is established between the airfoil section and a root section, the root section dimensioned to mount the blade to a rotatable hub, and the airfoil section establishes an internal cooling arrangement comprising:
a flag cooling passage including a first section and a tip flag section, the first section extending in the radial direction from the root section, and the tip flag section extending in the chordwise direction along the tip portion from the first section to the trailing edge;
a serpentine cooling passage including a plurality of sections interconnected by one or more bends; and
the tip flag section and the serpentine cooling passage are situated on opposite sides of the internal wall relative to the thickness direction at a position aligned with the tip pocket relative to the chordwise direction.

15. The gas turbine engine as recited in claim 14, wherein the tip flag section is at least partially aligned with the tip pocket relative to the thickness direction.

16. An airfoil for a gas turbine engine comprising:
a platform section;
an airfoil section extending in a spanwise direction from the platform section to a tip portion establishing a tip, the airfoil section having an external wall defining pressure and suction sides extending in a chordwise direction between a leading edge and a trailing edge, and the pressure and suction sides spaced apart in a thickness direction between the leading edge and the trailing edge;
wherein the tip portion includes a tip pocket and a tip shelf extending inwardly from the tip, the tip pocket and tip shelf on opposite sides of a shelf wall, and the shelf wall has a serpentine profile;
wherein the tip pocket is bounded in the thickness direction between the shelf wall and a sidewall, the tip pocket extends in the spanwise direction from a pocket floor to the tip, and a radial face of the sidewall slopes outwardly from a first position to a second position at the tip, the first position corresponding to a span position of the pocket floor relative to the spanwise direction; and
wherein a bow angle is established between the first position and the second position relative to an axis extending in the spanwise direction, and the bow angle is greater than or equal to 10 degrees.

17. The airfoil as recited in claim 16, wherein the sidewall extends along the pressure side of the airfoil section.

18. The airfoil as recited in claim 17, wherein the bow angle is less than or equal to 45 degrees.

19. The airfoil as recited in claim 16, wherein the airfoil is a turbine blade.

20. An airfoil for a gas turbine engine comprising:
- a platform section;
- an airfoil section extending in a spanwise direction from the platform section to a tip portion establishing a tip, the airfoil section having an external wall defining pressure and suction sides extending in a chordwise direction between a leading edge and a trailing edge, and the pressure and suction sides spaced apart in a thickness direction between the leading edge and the trailing edge;
- wherein the tip portion includes a tip pocket and a tip shelf extending inwardly from the tip, the tip pocket and tip shelf on opposite sides of a shelf wall, and the shelf wall has a serpentine profile;
- wherein the tip pocket extends in the spanwise direction from a pocket floor to the tip; and
- wherein the tip portion extends in the thickness direction between the pressure and suction sides to establish a width, the width measured at an innermost span position of the pocket floor relative to the spanwise direction, the airfoil section extends in the spanwise direction from the platform section to the tip to establish a height, and a ratio of the width to the height is equal to or greater than 0.1.

21. The airfoil as recited in claim 20, wherein the airfoil is a turbine blade.

* * * * *